United States Patent [19]

Buck

[11] Patent Number: 4,599,125

[45] Date of Patent: Jul. 8, 1986

[54] METHOD AND SYSTEM FOR FORMING SHEET MATERIAL INTO APERTURED SHAPES

[76] Inventor: Byron L. Buck, 7412 Via Lorado, Rancho Palos Verdes, Calif. 90274

[21] Appl. No.: 637,614

[22] Filed: Aug. 3, 1984

[51] Int. Cl.⁴ .............................................. B32B 31/18

[52] U.S. Cl. .................................... 156/248; 156/267; 156/268; 156/270; 156/344; 156/510; 156/513; 156/584

[58] Field of Search ............... 156/248, 249, 250, 267, 156/268, 270, 510, 513, 514, 344, 584

[56] References Cited

U.S. PATENT DOCUMENTS

| | | | |
|---|---|---|---|
| 2,304,787 | 12/1942 | Avery | 156/270 |
| 3,072,519 | 1/1963 | Salzman | 156/250 |
| 3,524,782 | 8/1970 | Buske | 156/248 |
| 3,878,018 | 4/1975 | Cospen et al. | 156/267 |
| 4,328,057 | 5/1982 | Gutow | 156/268 |

*Primary Examiner*—Caleb Weston

*Attorney, Agent, or Firm*—Fraser and Bogucki

[57] ABSTRACT

A method and apparatus for providing apertured elements such as reinforcing rings having precisely defined edges without tearing or distortion operates on an elongated strip of first and second sheet material held together by a detachable adhesive. Both perimeters of the desired apertured element are first cut in one sheet of the strip without cutting the other sheet. A second shape, within the inner perimeter of the apertured shape, is cut into the second sheet without cutting into the first sheet, either before or after the cuts in the opposite side. This leaves material within the apertured shape that is held in place by a border due to the adhesive backing. After first sheet material outside the apertured shape is separated from the second sheet, a mechanism is used to overcome the adhesive force at the border and remove the inner cuts simultaneously. Thus only the desired apertured elements are left on the second sheet to be removed for use either at that time or thereafter.

26 Claims, 5 Drawing Figures

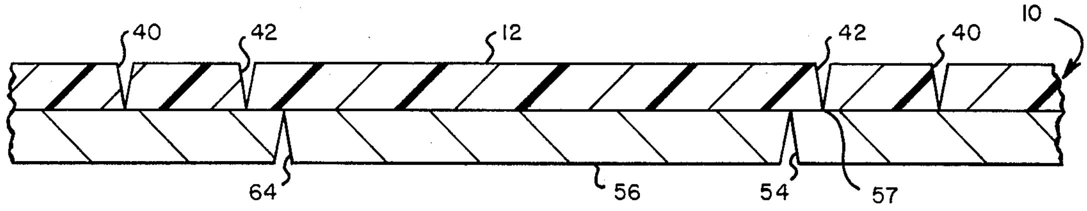
FIG. 2
FIG. 3
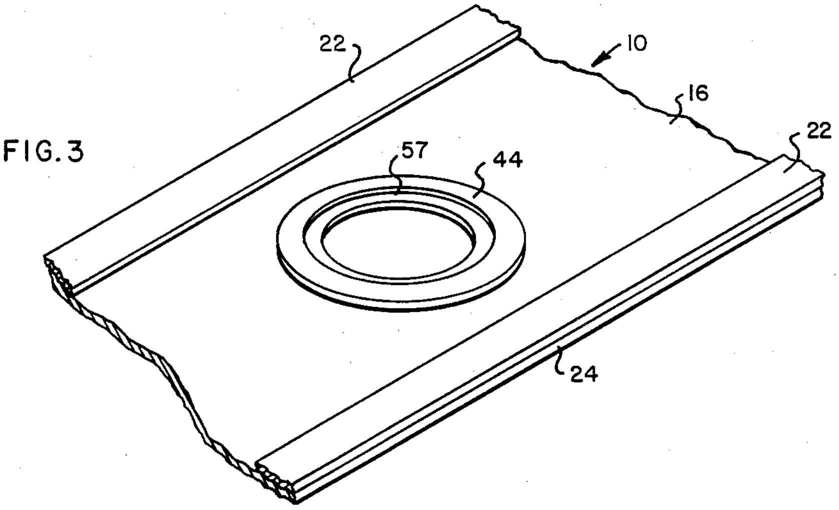
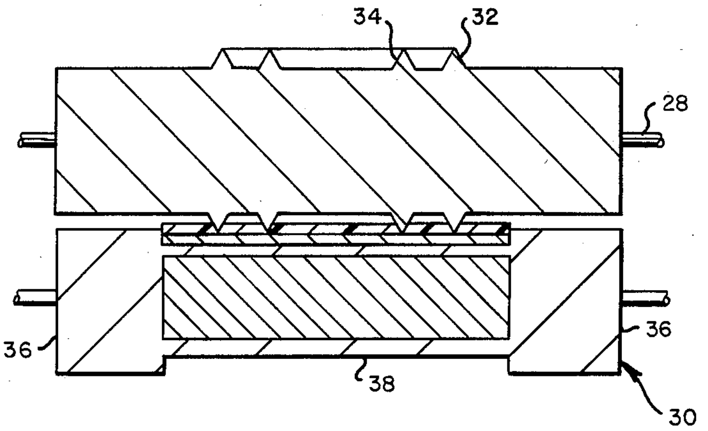
FIG. 4

METHOD AND SYSTEM FOR FORMING SHEET MATERIAL INTO APERTURED SHAPES

BACKGROUND OF THE INVENTION

The present invention relates to the manufacture of apertured shapes of sheet material, and is particularly directed to a method and system for producing adhesive backed rings such as reinforcing rings for floppy disks employed in computers.

Sheet materials, such as paper and plastic sheets, is now often cut into individual shaped pieces using die cutting techniques. A rotary cylindrical or reciprocable planar die having a raised cutting outline engages the sheet material against a fixed reference surface or anvil to cut the desired outline to precise shape, usually at high speed. Where all edges can tolerate minor bending or imprecision both the outer periphery and inner apertures on the die cut part can be formed on a single pass. Where no deformation or irregularity can be permitted, however, more complex techniques have had to be used. An example is found in the manufacture of reinforcing rings for floppy or flexible disks.

Substantial and widespread use is made of floppy disks in both small and large computers. Such disks are comprised of a thin pliant magnetic material retained within an envelope having openings for receiving drive members and magnetic heads. The floppy disks themselves have a plastic, e.g. Mylar, base with magnetic material on one or both sides. Each disk includes a central hole of substantially precise dimension used in positioning the disk for rotation.

In use, the floppy disk within its envelope is placed in a disk drive mechanism where a central positioning system, including a positioning hub, engages within the central hole and centers the inner periphery of the disk in position relative to the mechanism, and then rotates it. Because data on the disk is recorded in narrow closely spaced tracks, any disk eccentricity arising from inaccurate positioning can increase the possibility of data error. Because the disk must be shifted within its envelope and because repeated use causes wear and distortion of the inner periphery, accurate and repeatable positioning is not reliably achieved. To overcome or at least reduce such problems, suppliers and users often place a reinforcing ring around the disk, such ring being an adhesive-backed plastic material which reinforces the center of the disk and enables it to be positioned more precisely in the mechanism as well as to have a longer life.

The rings are generally formed from a strip or sheet of thin compliant material, such as a vinyl sheet, which is removably affixed by an adhesive to a paper backing. High speed die cutting is used to form the rings from the sandwich material. The rings may be formed by a double level cutting die, rotary or reciprocating, which cuts the center hole through the vinyl and the backing, but forms the outer radius by cutting only through the vinyl. This leaves the ring on the backing strip for subsequent application by machine to a disk. It is much more difficult, however, to fabricate and maintain a precise double level die than a single level die. Also, in making a full cut through the sandwich to form the rings, the inner periphery is heavily stressed and may be deformed. Additionally, the silicone adhesive which attaches the pliant sheet to the paper backing exudes and causes distortion at the edges. These irregularities adversely affect the precision with which the floppy disk can be positioned and may render the disk unacceptable.

This fabrication of precisely shaped reinforcing rings so as to leave the rings on a backing for subsequent mounting on floppy disks is a particularly high volume illustration of one application of techniques in accordance with the invention. It often happens that precisely formed or intricately shaped elements of sheet material are to be formed at high speed and low cost without damaging the peripheries of interior surface apertures.

It is accordingly one object of the invention to provide a simple method and system for forming precise apertured shapes in sheet members at realistic production rates using die cutting techniques.

Another object is the provision of a method and system for accurately cutting apertured shapes from a sandwich comprising a pliant sheet material affixed by a detachable adhesive to a backing sheet.

Yet another object of the invention is to provide procedure and apparatus for cutting shapes from a sheet material on a backing strip under conditions to prevent the adhesive from exuding from beneath the shape and without causing distortion at the edges of the shape.

SUMMARY OF THE INVENTION

The above objects and advantages are achieved according to the invention by the provision of a method and system for cutting reinforcing shapes from a layered material comprising a pliant sheet material affixed by a detachable adhesive to a backing sheet. The inner and outer peripheries of successive shapes are cut from the pliant material side of the layered material without separating the shape from the backing sheet and without breaking the material of the backing sheet. Another outline within the inner periphery of the shape is cut through the backing sheet from the opposite side. The two steps can be carried out in any sequence but provide an inner area of backing material which is attached to the desired annular or other shape in the pliant material only by the adhesive about the outer boundary of the desired shape. After removing pliant material outside the shaped area, if desired, the inner area of pliant material, and the smaller segment of backing sheet, are separated by overcoming the adhesive restraint exerted along the outer boundary. The desired shape alone, with a protected inner edge, is left on the backing sheet, to be separated from the backing sheet and separately processed. Alternately a roll of the backing sheet, containing spaced apart shapes, may be supplied to a customer.

In preferred practice, as applied to making reinforcing rings for floppy disks, an elongated strip of pliant sheet material adhesively secured to backing sheet sequentially and continuously passes through a die cutting system. At a first station, a rotary die makes single level sequential die cuts (or "kiss-cuts") on the pliant material side of the strip to cut both the inner and outer radii of successive rings simultaneously. At a second station another rotary die makes sequential single level die cuts in the backing sheet only, from the opposite side of the strip. The second die cuts form circles having a radius or diameter smaller than the inner diameter of the reinforcing ring, by approximately 1/16" in this example. The edge border around the inner disk of pliant material overlaps about the smaller center disk of backing material to hold both in position. Thereafter the strip passes through a separator which pulls away, from the backing sheet, waste material outside the rings. The web of backing material thus supports, in its center region, only the rings and the inner disks of pliant material and paper backing.

At a following station the interior disks of pliant and backing material are removed by overcoming the adhesion in the narrow offset region. Preferably this is done by a mechanical picker mechanism, which spears successive interior disks as they advance and collects them. Alternatively air or vacuum pressure against the backing sheet disk may be used to blow both the pliant material disk and the smaller backing sheet disk off the web. The remaining adhesively-backed rings of pliant material are protected by the inner boundary of backing material, and remain upon it. Typically, the entire web of backing material with regularly spaced rings is then supplied to a customer who applies them by machine of floppy disks. The rings so produced are of accurate shape with no distortion or frayed edges, and with adhesive uniformly distributed over the back side of the ring.

BRIEF DESCRIPTION OF THE DRAWINGS

The foregoing and other objects, features and advantages of the invention will be apparent from the following more particular discussion of an example of the invention, as illustrated in the accompanying drawings, in which:

FIG. 2 is an enlarged cross-section of the strip following formation of the die cuts in both the pliant sheet material and the backing sheet taken on line 2—2 of FIG. 1;

FIG. 3 is an enlarged perspective plan view of a portion of the strip showing the circular die cuts in both the pliant sheet and the backing sheet;

FIG. 4 is a cross-sectional view showing a rotary die cutter in combination with an anvil for producing the die cuts at the first station.

DETAILED DESCRIPTION OF THE INVENTION

Figures 1, 5:
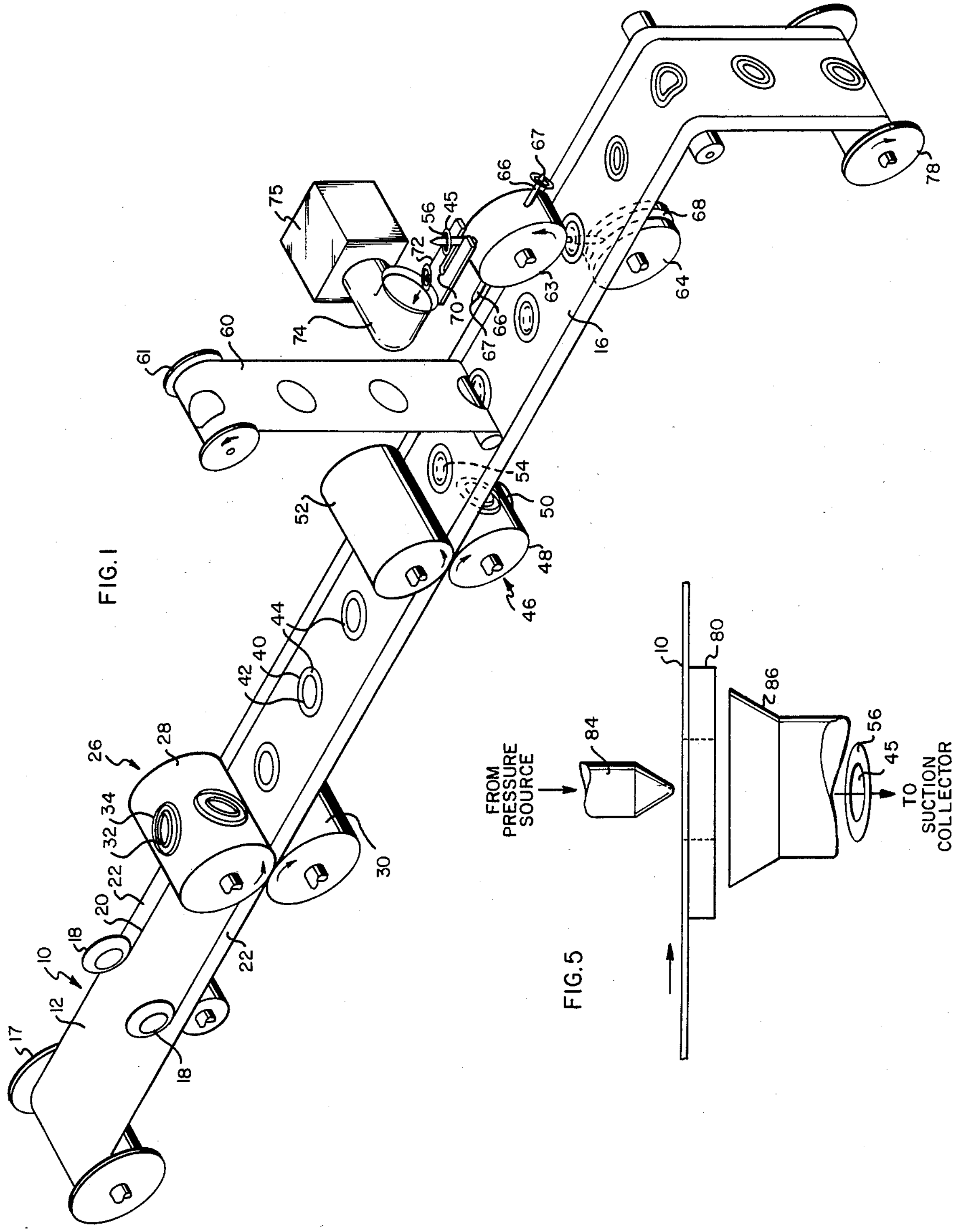
FIG. 1 is a perspective view of a system for producing reinforcing rings from a strip of pliant material adhesively secured to a backing sheet.
FIG. 5 shows a modification of the technique for removing the disks of pliant material and backing sheet formed by the die cutters.

Referring to FIGS. 1–4 of the drawings, a sheet or strip of a sandwich or laminate 10 comprises a pliant sheet material 12 secured by an interposed detachable adhesive as indicated at 14 to a backing sheet 16. The pliant sheet material is comprised of a flexible plastic material such as a vinyl or polyester sheet, e.g. "Mylar," and the backing sheet 16 is comprised of any suitable flexible sheet material such as a kraft paper backing. This combination is used in this practical example of a system for making reinforcing rings for floppy disks.

The strip 10 with the pliant sheet 12 overlying the backing sheet 16 may be fed by a suitable drive means (not shown) from an unwind station or reel 17 through a pair of edge line cutters 18 which cut edge lines 20 along the strip through the depth of the pliant sheet 12 only, forming edge borders 22 along opposite edges 24 of strip 10. Edge borders of this form may or may not be employed at the discretion of the fabricator.

The strip 10 is then advanced to a first cutter work station 26 where a rotary cylindrical die 28 is positioned in cooperation with a rotary cylindrical anvil 30 on opposite sides of the strip 10. The rotary die 28 has an inner series of circular die cutter elements 32 and concentric circular outer cutter elements 34 positioned circumferentially in equally spaced relation around its periphery.

The strip 10 passes between the closely spaced parallel surfaces of the rotary die cutter 28 and the rotary anvil 30. As seen in FIG. 4, a single level die cut in the form of two circular concentric kiss-cuts in the upper pliant sheet 12 as indicated at 40 and 42 (FIG. 2) is formed by the circular concentric die elements 32 and 34. By the term "kiss-cut" is meant that the circular cuts 40 and 42 in pliant sheet 12 are of a depth such that the lower outer edge of the circular cutter elements 32 and 34 completely penetrate and separate the upper pliant sheet 12, but barely touch the upper surface of the backing sheet 16 so that no cutting or breaking of the backing sheet 16 occurs. In order to adjust for proper kiss-cuts in the pliant sheet 12 as described above, common practice is to modify the clearance by changing the rotary die or the anvil, or both.

The outer circular cut 40 in the pliant sheet 12 corresponds to the outer radius of each reinforcing ring 44 thereby formed in the pliant sheet 12, while the inner cut 42 corresponds to the inner radius of the ring 44. Following the sequential single level kiss-cuts 40 and 42 at the first station 46, the rings 44 and inner disks 45 of pliant material produced by such cutting remain adhesively attached to the backing sheet 16. The strip 10 is then passed to a second work station 46 where the strip passes between a second rotary cylindrical die 48 having a plurality of circular cutters 50 equally spaced around the periphery of the rotary cutter 48 and facing the backing sheet 16, and an opposed rotary cylindrical anvil 52. At this station the cutter element makes a second circular kiss-cut 54 (see FIG. 2) through the backing sheet 16 without cutting or penetrating the undersurface of the pliant sheet 12.

As seen in FIGS. 2 and 3 the circular cut 54 into the backing sheet 16 is concentric with the cut circles 40 and 42 forming the ring 44 in the pliant sheet 12, and has a diameter smaller than the diameter of the inner edge 42 of the ring 44. As best seen in FIGS. 2 and 3, the two stations 26, 46 form a center disk 56 of backing material which is smaller than the disk 45 of pliant material formed inside the ring 44, leaving an outside border 57 which holds the pliant disk 45 securely attached to the backing sheet 16. In turn the adhesive force holds the center backing disk 56 in position securely attached to the larger disk 45 of pliant material, without separating either of the cut disks 45 and 56 from the sandwich strip 10. The difference in diameter between the larger disk 45 of pliant material and the smaller disk 56 of backing material can be of the order of 1/16". The contiguous border 57 area provides adequate retentive force to hold the inner disks 45, 56 in position, but the retentive force is limited to a value which can readily be overcome.

It is to be noted that the sequence of cuts can be reversed at the user's option, with the kiss-cut in the backing material 16 being made first.

The resulting strip containing the sequentially formed double kiss-cuts 40 and 42 in the pliant sheet 12 and the kiss-cut 54 in the backing sheet 16 is then passed adjacent a separator roller 58. An apertured web 60 of pliant material, here vinyl, is turned sharply upward, 90° away from the backing sheet 16 to which the rings 44, disks 45 and edge borders 22 of vinyl remain attached. In this example the backing sheet 16 is moved linearly as the apertured web 60 is peeled off at an angle of 90°. Alternatively, however, the separations can be made at different times and in different ways. For example, the separation can be made after the first kiss-cut defines the rings 44, and the edge borders 22 need not be used. After separation, the web 60 is wound on a takeup reel 61 driven in synchronous fashion by conventional means (not shown).

The backing sheet 16, to which the rings 44 and disks 45 and the outer borders 22 of vinyl are adhesively secured is then passed across a third work station 62 for removal of the center disks 45, 56. The work station 62 includes a pair of spaced apart rollers 63, 64 rotated in synchronism with the movement of the backing sheet 16, which passes between them. A first roller 63 has a number (here four) of regularly spaced, radially mounted, picker shafts 66 having pointed tips 67. The tips 67 intercept the disks 45, 56 at or adjacent the center of each disk 45, 56 and penetrate through to enter within a facing peripheral groove 68 in the second roller 64, which acts as an anvil in support of the strip material. As the tips 67 arc away from the second roller 64, the smaller disk 56 of paper backing and the adjacent larger disk 45 of vinyl are pulled out from the backing sheet 16 as the picker 66 movement overcomes the adhesion between the peripheral edge portion 57 of the disk 45 and the adjacent interior boundary 68 of backing sheet 16. As the disks 45, 56 impaled on the pickers 66 are then rotated away from the second roller 64, the pickers 66 pass through a central slot 70 in a separator comb 72. The disks 45, 56 pass above the comb 72 and are swept off as the picker 66 rotates further. In this position, approximately 180° from the region of contact, the adhesive exposed on the disk 45 is away from the comb 72 surface, being reversed in attitude during rotation. The disks 45, 56 are not free after removal from the picker 66 because they are under the influence of a suction tube 74 which leads to a blower and reservoir 75, shown only generally, where the waste material is collected.

There is thus remaining on the backing sheet 16 only the opposite edge borders 22 of vinyl material and the vinyl rings 44. This web usually supplied directly to customers, after being wound on a takeup reel 78. The end user typically feeds the sheet 16 into a system for automatically transferring the rings 44 to floppy disks in proper position. Alternatively the backing sheet 16 may be pulled at a sharp angle around a lower roll to remove the adhesive-backed reinforcing rings 44 from the paper backing 16 so that the rings 44 can be packaged differently or fed to a positioner for emplacement on floppy disks. The paper backing 16 and edge borders 22 are discarded.

Referring to FIG. 5, there is shown a modification which can be used in place of the picker mechanism at work station 62 in FIG. 1 for removing the disk 56 of paper backing and the adjacent disk 45 of pliant material or vinyl. In this modification, the backing sheet 16 containing the disks 56 and 45 is passed across a backing plate 80 having an aperture 82 sufficient in diameter to surround the larger disk 45. On opposite sides of the aperture 82 a blower tube 84 coupled to an air pressure source (not shown) blows against the vinyl disk 45, toward the backing plate 80, while a suction tube 86 exerts a complementary force against the backing sheet 16. The combined air flows overcome the adhesive force between the vinyl disk 45 and the backing 16 at the border 57, impelling the disks 45, 56 into the suction tube 86 for collection. The positive pressure blower tube 80 may not be needed where the adhesive attraction is low because of the size of the area used or the type of adhesive employed.

From the foregoing, it is seen that the invention provides a simple method and system for producing adhesively backed apertured elements of precisely defined inner and outer perimeters. While the example given pertains to the particular and critical problems of making exact the concept is particularly applicable wherever both perimeters must be formed without distortion or fraying. It will be appreciated that reciprocating dies can be used instead of rotarty dies in the successive cutting operations.

Since various changes and modifications of the invention will occur to and can be made readily by those skilled in the art without departing from the invention concept, the invention is not to be taken as limited except by the scope of the appended claims.

What is claimed is:

1. The method of providing adhesively backed apertured elements of a first material and having inner and outer peripheries from a laminate comprising a first sheet material affixed by a detachable adhesive to a backing sheet of second material comprising the steps of:

cutting apertured elements having the inner and outer peripheries desired on a sequential basis into the first material side of the laminate without breaking the backing sheet;

cutting interior peripheral shapes having boundaries within the inner peripheries of the apertured elements through the backing sheet without separating such interior peripheral shapes from the first sheet material;

separating the first sheet material outside the apertured elements from the backing sheet to leave said apertured elements and the material defining the interior shapes of first sheet material within the apertured elements adhering to the backing sheet at the outer edges of the interior portions within the apertured elements; and separating the interior portions of the apertured elements of first sheet material and the smaller interior peripheral shapes of backing sheet from the laminate while leaving the apertured elements on the backing sheet.

2. The method as set forth in claim 1, wherein the interior portions of the apertured elements and the smaller peripheral shapes of backing sheet are mechanically removed.

3. The method as set forth in claim 1, wherein the interior portions of the apertured elements and smaller interior peripheral shapes of backing sheet are concurrently removed by air pressure against said interior portions and interior peripheral shapes overcoming the adhesion of the outer edge of the said interior portion against the backing sheet.

4. The method as set forth in claim 1 above, wherein the steps are performed at successive work stations and including the further step of separating the apertured elements from the backing sheet, and wherein the cutting steps are performed by a rolling cutting action repeated sequentially as the laminate passes the stations.

5. The method as set forth in claim 1, wherein the steps are performed at sucessive work stations and wherein the laminate comprises an elongated strip and the cutting is made by single level die cuts on opposite sides of the strip on a sequential basis as the strip is passed through the work stations, with the cutting of the apertured elements preceding the cutting of the interior peripheral shapes on the opposite side of the strip.

6. The method as set forth in claim 5, wherein the inner periphery of the apertured elements in the first material and the outer periphery of the interior shapes in the backing sheet are of similar shape and spaced apart by a sufficient gap to provide a border of sufficient adhesive force to hold the cut interior portions of the first sheet material and the backing sheet in place through processing until the separating step is reached.

7. The method as set forth in claim 6, wherein the first material of said strip is a polyester or a vinyl sheet material and said backing sheet is a paper backing, and wherein the apertured elements are rings.

8. The method of providing reinforcing rings having inner and outer radii for floppy disks from a strip comprising a pliant sheet material affixed by a detachable adhesive to a backing sheet comprising the steps of:

concurrently and sequentially making single level double die cuts in the pliant material to form concentric circles having the inner and outer radii of said ring and an interior disk of pliant material, without breaking the material of the backing sheet, at one work station;

sequentially making single level die cuts to form circles concentric with the rings and having diameters smaller than the inner diameters of said rings through the backing sheet to form disks of backing material having diameters smaller than the diameters of said disks of pliant material, at another work station, the first two work stations being reversible in order;

stripping the pliant material outside the ring from the backing sheet to leave said rings and the interior disks of pliant material, the interior disks being adhered to the disks of the backing sheet solely by the adhesive in the borders about the disks of the backing sheet; and concurrently and sequentially removing the disks of pliant material and the smaller disks of backing material from said backing sheet, while leaving the rings on said backing sheet, by overcoming the retentive force of the adhesive in the borders.

9. The method as set forth in claim 8, said stripping of the pliant material from the backing sheet being carried out while bending the pliant material away from the backing sheet.

10. The method as set forth in claim 8, wherein the disks of pliant material and smaller disks of backing sheet are removed mechanically and sequentially by mechanical extraction at a work station.

11. The method as set forth in claim 8, wherein the larger disks of pliant material and smaller disks of backing sheet are concurrently and sequentially removed against the adhesion of the disks of pliant material to the interior rings of backing sheet around said smaller disks of backing material, by pneumatic forces exerted at a work station to overcome the adhesion and carry the disks away.

12. The method as set forth in claim 8, including the initial step of concurrently cutting edge borders through said pliant material along opposite edges of said strip without cutting said backing sheet, and said stripping comprising separating the pliant material between said edge borders from the backing sheet, and leaving said borders of pliant material on said backing sheet.

13. The method of providing reinforcing rings for floppy disks from a strip comprising a pliant sheet material affixed by a detachable adhesive to a backing sheet comprising the steps of:

cutting edge borders from the pliant material side of said strip into said pliant material along opposite edges of said strip without cutting the material of said backing sheet;

passing said strip to one work station and concurrently making a single level double die cut in said pliant material from the pliant material side of said strip with a rotary cutter and forming concentric circles having the inner and outer radii of said ring and an interior disk in said pliant material without substantially cutting the material of the backing sheet;

passing said strip to another work station and making a single level die cut in said backing sheet from the backing sheet side of the strip to form a circle therein concentric with the ring and having a diameter smaller than the inner diameter of said interior disk so as to provide a disk of backing sheet material smaller than said interior disk of pliant material;

stripping the pliant material outside the ring and between the edge borders from the backing sheet to leave said ring in said disk of pliant material and said edge borders adhered to the backing sheet;

passing said backing sheet to another station and concurrently removing the disk of pliant material and the smaller disk of backing sheet against the adhesion of the disk of pliant material to the backing sheet around said smaller disk; and separating the ring containing an adhesive backing from the backing sheet.

14. The method as set forth in claim 13 above, wherein the difference in the diameters of the inner edge of the ring in the pliant material and the outer edge of the disk in the backing sheet is approximately 1/16" and the single level die cut in the backing sheet is made by rotary cutting.

15. A system of providing precisely defined apertured shapes having an internal aperture perimeter and an outer perimeter from an elongated strip comprising a first sheet material affixed by a detachable adhesive to a second sheet comprising:

first means for concurrently cutting the internal aperture perimeter and the outer perimeter of the apertured shapes in the first sheet material side of the strip without breaking the material of the second sheet to define the apertured shape and an element therewithin;

second means for cutting a second shape corresponding generally to the element within the internal aperture perimeter of the apertured shape, but within the periphery of said apertured shape through the second sheet substantially without breaking the first sheet material, the first and second means being sequentially disposed along the elongated strip in either order of precedence;

means further disposed along the elongated strip for separating the first sheet material outside the apertured shapes from the second sheet to leave said apertured shapes and the element interior thereto adhered to the second sheet by the border along the inner element within the apertured shape; and means further disposed along the elongated strip for extracting the element of first sheet material and the smaller second shape of second material from the second sheet while leaving the apertured shape on the second sheet.

16. The invention as set forth in claim 15 above, wherein said means for concurrently cutting comprises a first work station for successively cutting the apertured shapes at spaced apart positions in the strip, said means for cutting the second shape comprises a second work station for successively cutting the second shapes at spaced apart positions in the strip and said means for extracting the element of first sheet material and the second shape in the second sheet comprises a third work station for successively extracting such elements and second shapes, the strip passing continuously between the work stations.

17. The system as set forth in claim 16, wherein said means for cutting said inner and outer perimeters comprises a rotary cylindrical die cutter having a plurality of first die cutter elements spaced substantially equally around the periphery of said rotary die, and a plurality of second die cutter elements of smaller outline than said first cutter elements and each positioned within said first cutter elements, and forming a single level double die cut in said first sheet material, and wherein said rotary cylindrical die cutter further comprises a rotary cylindrical anvil, said elongated strip passing between said rotary die and said rotary anvil, said die cutter elements on said rotary die being disposed to effect a kiss-cut through said first sheet material by said die cutter elements substantially without cutting the second sheet material.

18. The system as set forth in claim 17 above, wherein said second means for cutting a second shape comprises a second rotary cylindrical die and anvil through which the strip passes, the die having a number of die cutter elements spaced substantially equally therearound, for effecting a kiss-cut through said second sheet without substantially cutting said first sheet.

19. The system as defined in claim 16, said means for removing said element of first sheet material within the apertured shape and the second shape of second sheet material comprising a picker mechanism including a first rotatable member containing a plurality of picker pins spaced apart on the periphery thereof, a second rotatable member disposed adjacent the first rotatable member with the strip passing therebetween, the second rotatable member including recess means for receiving each picker pin and said picker pins being positioned to penetrate said elements and second shapes successively in the elongated strip as they pass said rotatable members, and means for removing said penetrated elements and second shapes from said picker pins.

20. The invention as set forth in claim 19 above, wherein said means for removing said penetrated elements and second shapes from said picker pins comprises comb means disposed adjacent the first rotatable member for cleaning material off the picker pins as they rotate, and suction collector means for withdrawing the material cleaned off the picker pins by the comb means.

21. The system as defined in claim 16, said means for removing the element of first sheet material within the apertured shape and the second shape of second sheet material comprising pneumatic means positioned adjacent the second sheet side of the strip, for impinging pressurized air against said element and second shape and a collector suction tube positioned directly opposite said pneumatic means on the opposite side of said strip for receiving said element and second shape removed by air pressure from the elongated strip.

22. The system as defined in claim 16, further including means disposed adjacent the strip after the means for extracting, for winding the strip into a reel.

23. The system for providing reinforcing rings for floppy disks from an elongated strip comprising a pliant sheet material affixed by a detachable adhesive to a backing sheet comprising:

a first rotary die mechanism positioned adjacent the pliant sheet material side of said strip, said first rotary die mechanism comprising a rotary die and anvil combination, the rotary die containing a plurality of first circular cutting dies substantially equally spaced around the periphery of said rotary die and a plurality of second circular cutting dies of smaller diameter than said first cutting dies and each concentrically positioned within said first cutting dies, said rotary die and anvil combination forming single level double cuts of concentric circles having the inner and outer radii of the ring in the pliant material of said strip substantially without cutting the material of the backing sheet as the strip passes by;

a second rotary die mechanism spaced from said first rotary die mechanism along the strip and containing a plurality of circular cutting dies substantially equally spaced around the periphery of said second rotary die opposite an anvil disposed and arranged to cut circles defining disks of small diameter concentric with the rings in the backing sheet side of said elongated strip without substantially cutting the pliant sheet, with edge borders of the pliant material within the inner ring adhering to the backing sheet adjacent the disk;

means for separating the pliant material outside the rings from the backing sheet, to leave said rings, interior disks of pliant material and edge borders adhered to the backing sheet, said last mentioned means including roller means for passing said separated pliant material at an angle away from said backing sheet;

means for removing the disks of pliant material and the smaller disks of backing material concurrently from the backing sheet while leaving the rings on the sheet of backing material; and means for separating the rings from the backing sheet.

24. The system as defined in claim 23, said means for removing the disk of pliant material and the disk of backing sheet comprising a picker mechanism positioned adjacent the pliant material side of the strip, for engaging the said disks of pliant material and backing sheet and removing them from the strip while leaving the reinforcing rings on the backing sheet.

25. The system as defined in claim 24, wherein said picker mechanism comprises a pair of rollers on opposite sides of the strip moving in synchronism with the elongated strip, a first of the rollers including a number of radially mounted picker pins disposed to penetrate and extract successive ones of the disks of pliant material and backing sheet from the pliant material side on the strip as it passes by, the second of the rollers being on the backing sheet side and having recess means for freely receiving the tips of the picker pins while supporting the backing sheet, comb means along the path of movement of the picker pins after extraction of the disks for separating said disks extracted from the strip, and collector means adjacent the comb means for withdrawing said disks from the comb means.

26. The system as defined in claim 23, said means for removing said disk of pliant material and said disk of backing sheet comprising means disposed adjacent the strip for flowing air against the pliant material side and suction collector means on the opposite side of the backing sheet to substantially overcome the adhesion between the interior disks of pliant material and the backing sheet, the suction collector means withdrawing said disks from the strip region.

* * * * *